Nov. 28, 1967   L. F. BARTOLETTI   3,354,574
FISHING ROD GUIDE
Filed April 19, 1965

INVENTOR
*Louis F. Bartoletti.*

United States Patent Office 3,354,574
Patented Nov. 28, 1967

3,354,574
FISHING ROD GUIDE
Louis F. Bartoletti, 343 101st St.,
Brooklyn, N.Y. 11209
Filed Apr. 19, 1965, Ser. No. 449,014
2 Claims. (Cl. 43—24)

ABSTRACT OF THE DISCLOSURE

This guide is made in two parts, a supporting structure to be secured to a fishing rod and a guide ring which is secured to the supporting structure by means of two threaded members, so that the guide ring can be readily removed and replaced without removing the supporting structure.

---

This invention relates to fishing tackle, and more particularly, to that one piece of fishing tackle known as a fishing rod guide.

Fishing rod guides have a tendency to wear out, particularly when used on a spinning rod. Unfortunately, at the present time, one must purchase not only the guide itself, but also its supporting members since they are welded or otherwise secured together to form a one-piece unit that must be purchased in its entirety.

It is, therefore, the principal object of this invention to provide a fishing rod guide that permits one to remove the ring portion of the guide from its supporting member whenever the ring wears out and needs replacing without removing the entire guide from the fishing rod.

Another object of this invention is to provide a fishing rod guide that is so constructed that one need only purchase a new ring portion when the old one wears out, is accidentally broken, or is otherwise damaged.

Another object of this invention is to provide a fishing rod guide that will permit one to reduce the yearly cost of his fishing tackle upkeep for the above-noted reason.

Another object of this invention is to provide a fishing rod guide having but two easily removed screws securing the same to its supporting member that is fixed to the fishing rod.

Still another object of this invention is to provide a fishing rod guide, the ring portion of which can be replaced in just a few minutes by anyone having pliers or a small wrench at hand.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
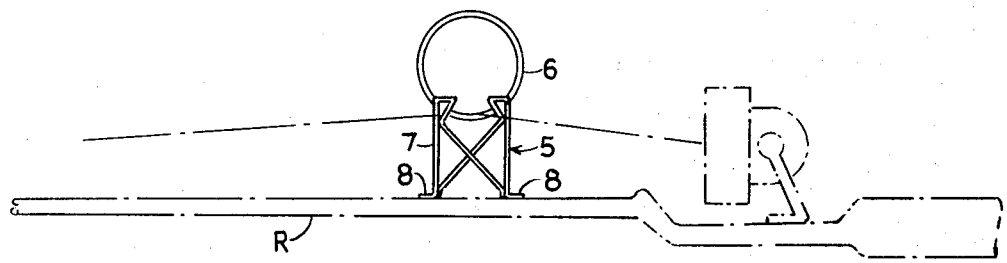
FIGURE 1 is a side view of a typical fishing rod with the fishing rod guide secured in place and shown in solid lines.
Figure 2:
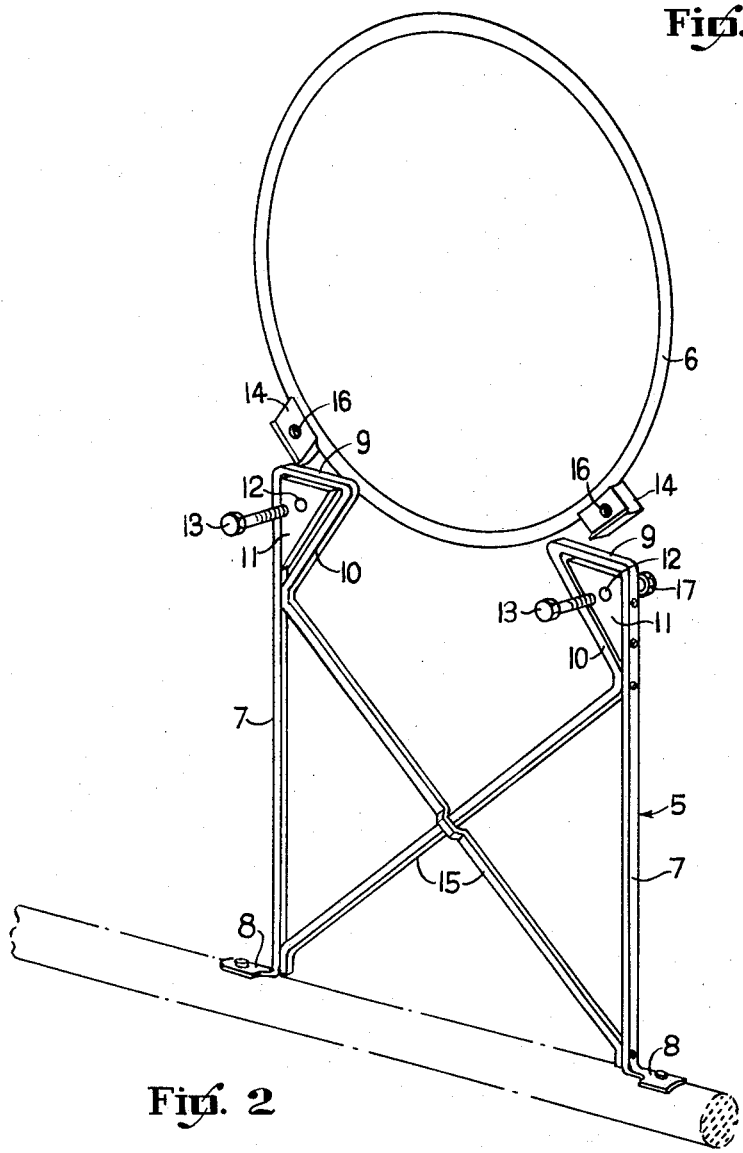
FIGURE 2 is an enlarged pictorial view of this invention with its supporting structure secured in place on a fishing rod, which is shown in phantom lines, and the ring portion removed from the supporting structure.

Looking first at FIGURE 2 of the drawing, it will be seen that this invention consists of two basic parts, the ring supporting structure 5, and the ring 6. The aforesaid ring supporting structure 5 is made of bar stock or the like and embodies a pair of vertically disposed and spaced parallel members 7, each having a horizontally disposed foot 8, contoured to fit the fishing rod which is indicated in the drawing by the capital letter R. The upper end of each member 7 is provided with an inwardly turned horizontal member 9 as well as an angularly disposed member 10 extending at an angle back to member 7. This just described construction provides a supporting frame for the gusset plates 11 in the center of which are the openings 12 for the reception of the screws 13 after the fittings 14 of the ring 6 are put in place. There are two of the fittings 14, secured to the ring and spaced from each other along the circumference of the ring 6, as is seen in FIGURE 2 of the drawing. Continuing to look at FIGURE 2, one can see that the ring supporting structure 5 is also provided with two crossed braces 15 to provide rigidity to the supporting structure. The ring supporting structure 5 and its related members can be formed from two pieces of material, as has been illustrated in FIGURE 2. The only exception to this construction are the two gusset plates 11, which can be welded or otherwise secured in place within the supporting frames in structure 5. The ring 6 is preferably made circular in cross-section. The fittings 14 are each made of two separate rectangular plates and having aligned openings 16 therein. These openings are for reception of the screws 13 on the end of each one of which is screwed the nut 17 after the ring 6 has been put in place on top of the ring supporting structure 5 and the two rectangular plates of each fitting 14 are slid down one on each side of the gusset plates 11.

In use, the supporting structure 5 is secured to the rod as shown in FIGURE 2 and ring 6 is secured to the supporting structure as indicated in FIGURE 2. The line is threaded through the ring as shown in said figure. One can the proceed to fish, in the usual way. It is noted that spinning reels are usually below the rod when in use so that the line is out of contact with the structure securing ring 6 to supporting structure 5. Although the ring and its supporting structure are shown large in the drawings, the size of these members is merely a matter of choice. Also, the ring positioned as shown causes a slight increase in wear and a slight drag which are not sufficient to be appreciable.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A fishing rod guide of the character described, comprising a ring that is round in cross-section; a ring supporting structure made of bar stock or the like and embodying a pair of vertically disposed and spaced parallel members, the lower end of each one of which terminates in a horizontally disposed foot secured to a fishing rod, and the upper end of each one of the said parallel members being provided with a horizontal member inwardly turned toward each other as well as an angularly disposed member extending from the end of the horizontal member at an angle back to its associated parallel member, thereby providing a pair of triangular frames in each of which is secured a gusset plate having an opening in the center thereof, a pair of fittings each comprising a pair of rectangular plates secured to the said ring at points spacing the said fittings to coincide with the spacing of the gusset plates from each other, aligned openings extending through both plates of each fitting, the said plates of each fitting being adapted to engage its associated gusset plate with one rectangular plate on each side thereof and with the openings in the fitting plates aligned with the opening in the gusset plate, and a pair of screws, each passing through a fitting and gusset plate to secure the said ring to said ring supporting structure.

2. A fishing rod guide as defined in claim 1, and including a pair of crossed braces secured to the vertical members to provide rigidity to the supporting structure.

References Cited

UNITED STATES PATENTS

| | | | |
|---|---|---|---|
| 868,563 | 10/1907 | Holzmann | 43—24 |
| 2,317,129 | 4/1943 | Brown | 43—24 |
| 2,778,141 | 1/1957 | Haas | 43—24 |
| 3,058,254 | 10/1962 | Gorham | 43—24 |
| 3,117,388 | 1/1964 | Clarke | 43—24 |

FOREIGN PATENTS 2,307    1891    Great Britain.

SAMUEL KOREN, *Primary Examiner.*

D. J. LEACH, *Assistant Examiner.*